(12) United States Patent
Fanto et al.

(10) Patent No.: US 10,466,418 B2
(45) Date of Patent: Nov. 5, 2019

(54) PHOTON GENERATOR

(71) Applicant: The United States of America, as represented by the Secretary of the Air Force, Washington, DC (US)

(72) Inventors: Michael L. Fanto, Rome, NY (US); Paul M. Alsing, Chittenango, NY (US); Christopher C. Tison, Rome, NY (US); Stefan F. Preble, Rochester, NY (US); Jeffrey A. Steidle, Sharon Hill, PA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/833,274

(22) Filed: Dec. 6, 2017

(65) Prior Publication Data

US 2019/0146155 A1    May 16, 2019

Related U.S. Application Data

(63) Continuation of application No. 15/813,442, filed on Nov. 15, 2017.

(51) Int. Cl.
| | |
|---|---|
| *G02B 6/26* | (2006.01) |
| *G02F 1/225* | (2006.01) |
| *G02F 1/313* | (2006.01) |
| *G02B 6/12* | (2006.01) |

(52) U.S. Cl.
CPC ............. *G02B 6/26* (2013.01); *G02B 6/12* (2013.01); *G02F 1/225* (2013.01); *G02F 1/3132* (2013.01); *G02F 2203/055* (2013.01)

(58) Field of Classification Search
CPC .. G02B 6/12; G02B 6/26; G02F 1/225; G02F 1/3132; G02F 2203/055
See application file for complete search history.

(56) References Cited

U.S. PATENT DOCUMENTS

| 7,941,014 B1 * | 5/2011 | Watts ..................... B82Y 20/00 385/2 |
| 8,019,185 B2 * | 9/2011 | Yap ..................... G02B 6/12007 385/1 |
| 8,483,521 B2 * | 7/2013 | Popovic ............. G02B 6/29338 385/15 |
| 9,778,493 B1 * | 10/2017 | Krishnamoorthy ..... G02F 1/011 |
| 2010/0209038 A1 * | 8/2010 | Popovic ............. G02B 6/12007 385/1 |

* cited by examiner

*Primary Examiner* — Daniel Petkovsek
(74) *Attorney, Agent, or Firm* — Joseph A Mancini (57) ABSTRACT

The invention provides an apparatus for optical integrated on-chip generation of photon pairs as a building block to create entangled photon states required for quantum information processing. The invention provided a frequency selective optical coupling device which controls the transmission of light by varying the relative dimensions of otherwise symmetrical linear optical waveguides tangential to an annular optical waveguide, thereby controlling the coupling of light between the linear optical waveguides and the annular optical waveguide. Dimensional change of the optical waveguides is achieved by a heated medium in proximity of the optical waveguides and under electronic control.

12 Claims, 10 Drawing Sheets

$|\psi\rangle = (a_0 b_0 c_0 d_0 + a_1 b_1 c_1 d_1)|vac\rangle$

PHOTON GENERATOR

RELATIONSHIP TO OTHER PENDING APPLICATIONS

This patent application is a continuation of, cross references, and claims any and all priority benefit from U.S. patent application Ser. No. 15/813,442 filed on Nov. 15, 2017, now pending and incorporated by reference as if fully set forth herein.

U.S. patent application Ser. No. 15/813,442 cross references and claims the priority benefit under 35 USC § 119(e) of the filing date of provisional application Ser. No. 62/424,739 having been filed in the United States Patent and Trademark Office on Nov. 21, 2016 and now incorporated by reference as if fully set forth herein.

STATEMENT OF GOVERNMENT INTEREST

The invention described herein may be manufactured and used by or for the Government for governmental purposes without the payment of any royalty thereon.

TECHNICAL FIELD OF THE INVENTION

This invention relates generally to the field of quantum information processing and more specifically to integrated photonic devices that facilitate the same.

BACKGROUND OF THE INVENTION

Integrated photonics is proving to be a very promising platform for quantum information processing. Micro ring resonators are becoming a key component of such systems as they have been shown to be effective as photon-pair sources by means of exploiting a materials nonlinearity for spontaneous parametric downconversion (SPDC) or spontaneous four wave mixing (SFWM).

Often, it is desirable to have precisely one photon. While SPDC and SFWM sources generate pairs of photons, single photons can be achieved through heralding. Heralding is a technique in which the detection of a single photon from a pair is used to determine the existence of the other. One of the fundamental issues with ring resonators is their inherent 50% loss when critically coupled, regardless of operation in a single bus or double bus configuration. For single bus resonators (not shown), half of the generated photons are lost to scattering within the cavity.

Figure 1:
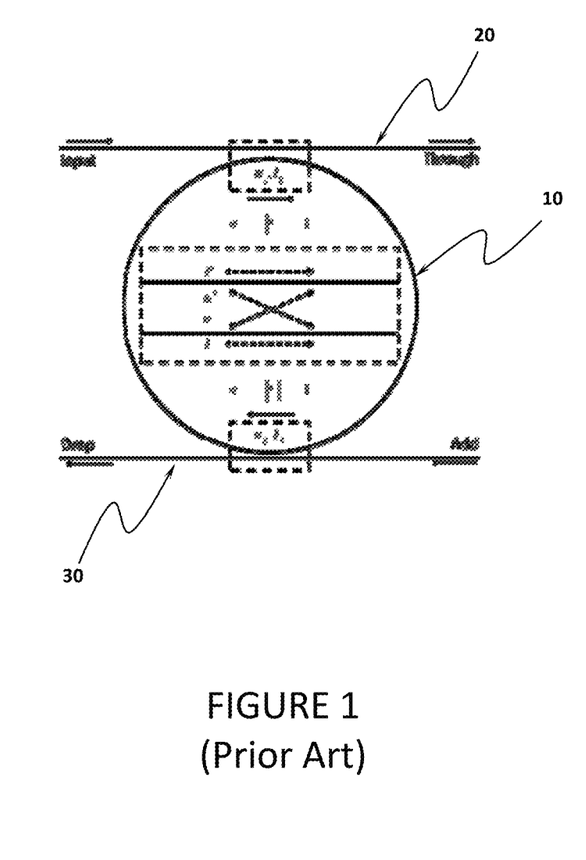
FIG. 1 is a prior art double bus resonator showing the coupling coefficients to the two waveguides.

Referring to FIG. 1 depicts prior art double bus resonators which are slightly different as the photons are free to leave the ring 10 through either port—resulting in an effective loss of 50%. All of this assumes that the ring resonator is critically coupled to straight waveguides 20, 30.

As with the two typical forms of ring resonators, they are denoted by the number of waveguides which near them giving them the titles of single bus and double bus, respectively. Both resonators work on the same principle. When light after a full round trip around the ring is of equal intensity and opposite phase to light that is reflecting into the ring, there is a destructive interference and no light can leave the resonator. Running time in reverse and seeing the light from the ring split at the directional coupler is an equivalent way to view this effect. In the case of the single bus resonator with no loss, resonance can only happen for a coupling ratio of 50/50 from the bus waveguide. When loss is present, this can happen for much lower splitting ratios. One form that loss can take is scattering. The double bus resonator can be seen as a special case of the single bus resonator where the scattering is captured into the second waveguide.

When the ring resonator is used for generation of single photons, two pump photons are absorbed and two single photons of equal energy to the pumps are created. Consequentially, the single photon light which is generated inside of the cavity has no input light to interfere with. Still referring to FIG. 1, therefore, in the case of the double bus resonator with the same coupler on input and output, the light has an equal probability of exiting the first 20 and second 30 waveguide buses. This splitting is witnessed as intrinsic loss. In the case of single bus ring resonators, the light can either leave through the input port or be lost inside the ring. When the pump wavelengths are optimally coupled, the propagation losses around the ring balance with the coupling out of the ring. The generated single photons (like the pumps) will have this same balance in terms of loss and ability to couple out of the ring. In other words, the single photons leave the ring only 50% of the time. The odds of the single photons leaving the ring can be improved at the cost of how well the pump wavelengths are coupled. This is a compromise between loss and generation rate.

The underlying issue of single and double bus ring resonators is that they do not have wavelength discriminating couplers. It is well understood there doesn't exist dichroic mirrors on a chip presently. Moreover, in 1995, Barbarossa found that resonant wavelengths of a micro ring cavity could theoretically be suppressed by coupling the input waveguide to the ring at two points. However Barbarossa's design provided an optical filter for classical light without generating any photons in the resonator cavity. What is lacking in prior work and therefore still needed is a device that generates entangled pairs of photons and interferometric coupling as a filter for quantum states of light.

OBJECTS AND SUMMARY OF THE INVENTION

It is therefore a primary object of the present invention to provide an apparatus and method to generate entangled pairs of photons for use in quantum information processing. It is another object of the present invention to provide an integrated photonic apparatus and method that generates entangled pairs of photons.

In a fundamental embodiment of the present invention, a frequency selective optical coupling device, comprises an annular optical channel, a first linear optical channel having a first input and a first output where the first linear optical channel is substantially tangential to the annular optical channel at a first point and a second point, a second linear optical channel having a second input and a second output, where the second linear optical channel is substantially tangential to the annular optical channel at a third point and a fourth point; and a predeterminable relative phase delay between the first and the second linear optical channels so as to cause a variance in an amount of light traversing the first and the second linear optical channels as a function of the frequency of the light.

In the preferred embodiment of the present invention, a photon generator device comprises an annular optical channel disposed in a chip, a first linear optical channel disposed in the chip, where the channel has a first input and a first output and where the first input and a first output are in common with each other and with an input to the chip, where the first linear optical channel is substantially tangential to the annular optical channel at a first point and a second point, and where a second linear optical channel is disposed in the chip with the second linear optical channel having a second input and a second output, where the second linear optical channel is substantially tangential to the annular optical channel at a third point and a fourth point, a first predeterminable relative phase delay between the first and the second linear optical channels so as to cause a variance in an amount of light traversing the first and the second linear optical channels as a function of the frequency of said light, and a second predeterminable relative phase delay between the second input and the second output, a photon detector sampling each of the second input and the second output, and a third output of the chip in common with the second input, a fourth output of the chip in common with the second output, and an electronic control subsystem in operative communication with the chip for facilitating the predeterminable relative phase delays and the photon detection.

Briefly stated, the invention provides an apparatus for optical integrated on-chip generation of photon pairs as a building block to create entangled photon states required for quantum information processing. The invention provided a frequency selective optical coupling device which controls the transmission of light by varying the relative dimensions of otherwise symmetrical linear optical waveguides tangential to an annular optical waveguide, thereby controlling the coupling of light between the linear optical waveguides and the annular optical waveguide. Dimensional change of the optical waveguides is achieved by a heated medium in proximity of the optical waveguides and under electronic control.

DETAILED DESCRIPTION OF THE PREFERRED EMBODIMENT

An object of the present invention is to devise a wavelength dependent means to split light. The present invention employs a Dual Mach-Zehnder (MZI) device having legs that are grossly misbalanced, wherein the MZI will have a wavelength dependence to its ability to split light. The present invention devises two unbalanced MZI, one which will perfectly transmit the pump wavelengths and partially reflect the signal wavelength. The other MZI will do the opposite, reflecting the pump wavelengths but perfectly transmitting the signal wavelength.

Figure 2A:
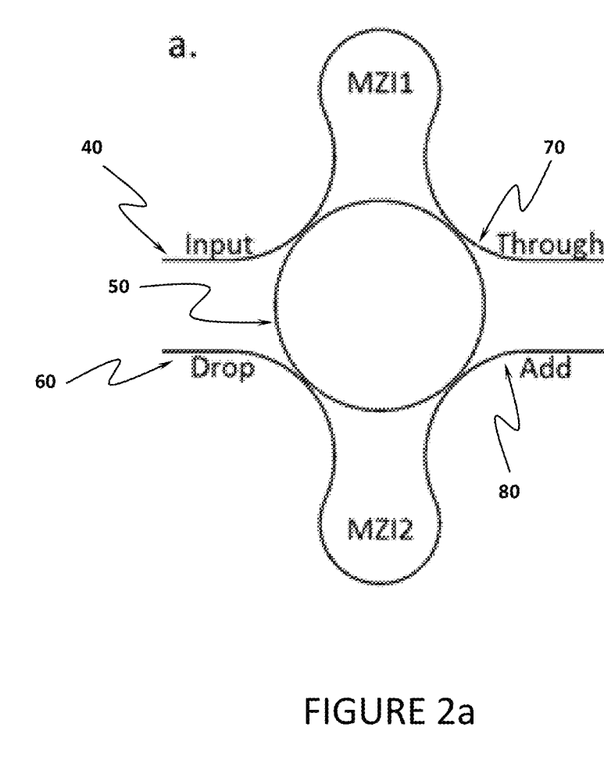
FIG. 2a is a Dual Mach-Zehnder device design of the present invention.
Figure 2B:
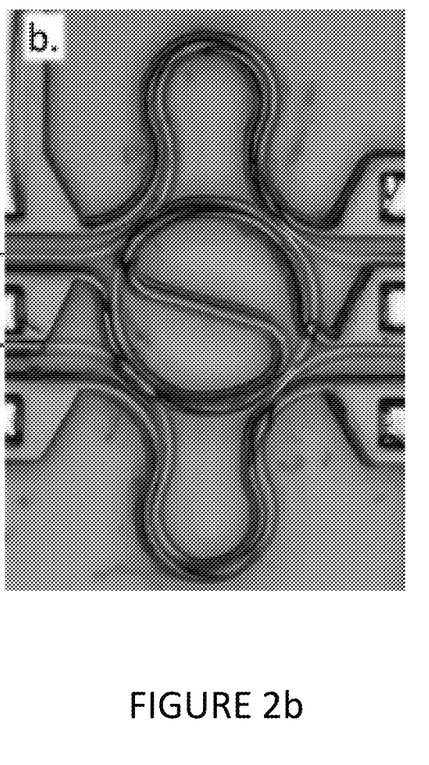
FIG. 2b is a microscope image of a fabricated Dual Mach-Zehnder device of the present invention.

Referring to FIG. 2a and FIG. 2b, the present invention essentially makes a Mach-Zehnder interferometer (MZI) out of the input waveguide 40 and the ring 50. Being a cavity, the ring 50 will only support specific wavelengths of light (where the resonance condition is satisfied) separated by the free spectral range (FSR). The spectrum of an unbalanced MZI is sinusoidal with the difference in optical path length between the two paths determining where in the spectrum the constructive and destructive interference will occur. For both the ring and the MZI, this is known as phase-matching. For the case of the ring this is phase-matching between consecutive round-trips while in the MZI it is phase-matching between the two different paths. The points of constructive interference in the spectra of these devices can be tuned by adjusting the relative phase between the different paths. In a fabricated device (see FIG. 2b) this can be accomplished by heaters or electro-optic phase shifters. The combination of these two elements results in a phase-matching condition that relies on both the resonance condition of the ring 50 and the interference pattern of the MZI. If the spectral width between two wavelengths of constructive interference in the MZI is twice the FSR of the ring 50, it is possible to suppress every second resonance of the ring 50.

Figure 3A:
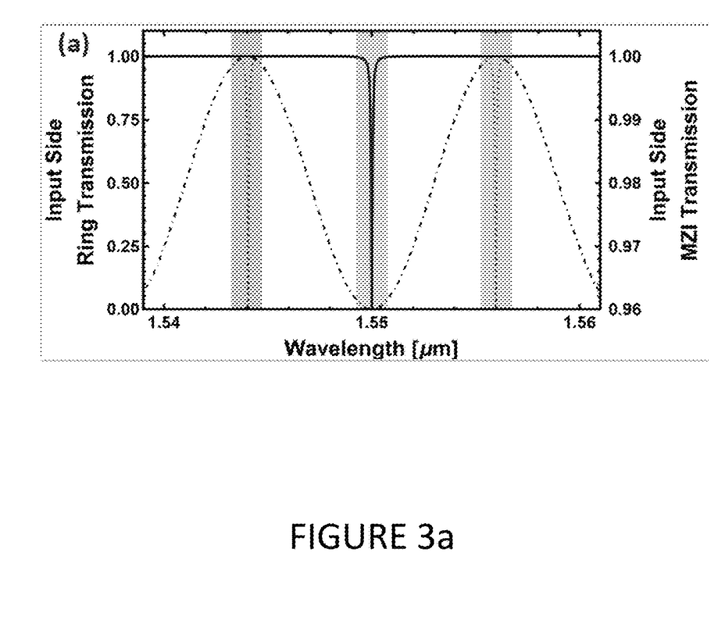
FIG. 3a is a Dual Mach-Zehnder theoretical spectrum showing suppressed resonances at the input side.
Figure 3B:
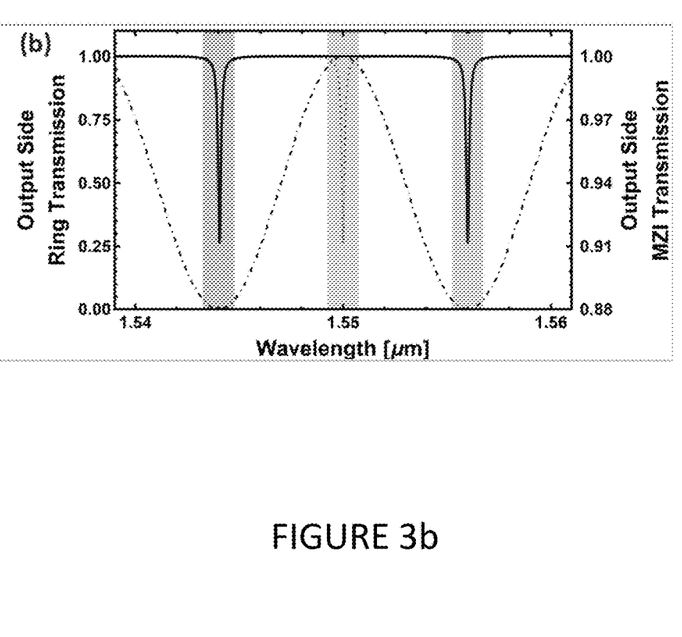
FIG. 3b is a Dual Mach-Zehnder theoretical spectrum showing output side transmission.

For the case of the photon-pair source function of the present invention, one side of the ring 50 can be used as the input 40 for the pump photons and the drop side 60 as the output for the generated photon-pairs. The MZI on the input side 40 (MZI1) can be tuned to suppress every other resonance, while MZI2 on the output of the ring 50 can be tuned to suppress the resonances allowed by MZI1 (i.e. they are perfectly out of phase with each other). This configuration will ensure the pump laser is critically coupled into the ring 50 while not allowing it to exit out the drop port 60, and ensures that any photons that are generated at the resonances allowed by the drop port 60 will only exit the over-coupled drop port 60 (because MZI1 is tuned to not be phased matched with those photons). This makes the device function as though it is two independent single bus ring resonators, one for the input side and one for the output side. The input side ring is characterized by the transmission from the input port 40 to the through port 70 while the output side ring is characterized by the transmission from the add port 80 to the drop port 60. The theoretical spectral response for both the input and output sides are shown in FIG. 3a and FIG. 3b, respectively. This configuration has three key features: (i) The pump is critically coupled so the photon generation rate will be maximized; (ii) The pump is filtered from the photons that exit the drop port minimizing noise and reducing the amount of off-chip filtering required; (iii) The photon pairs will always leave out the same over-coupled drop port, yielding 100% coincidence ratio, maximizing heralding efficiency.

Figure 4:
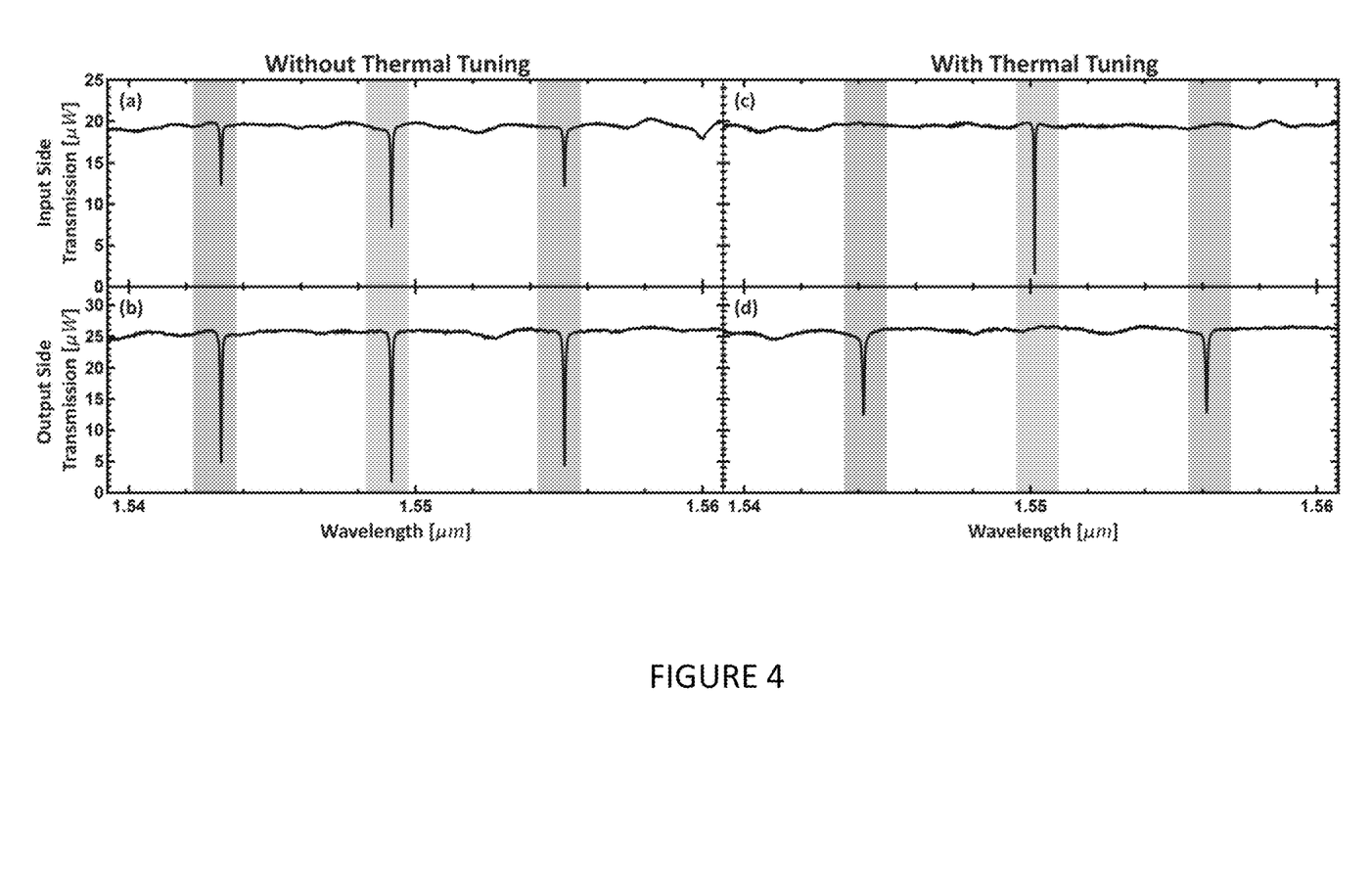
FIG. 4 is a Dual Mach-Zehnder experimentally generated spectrum showing suppressed resonances.
Figure 5A:
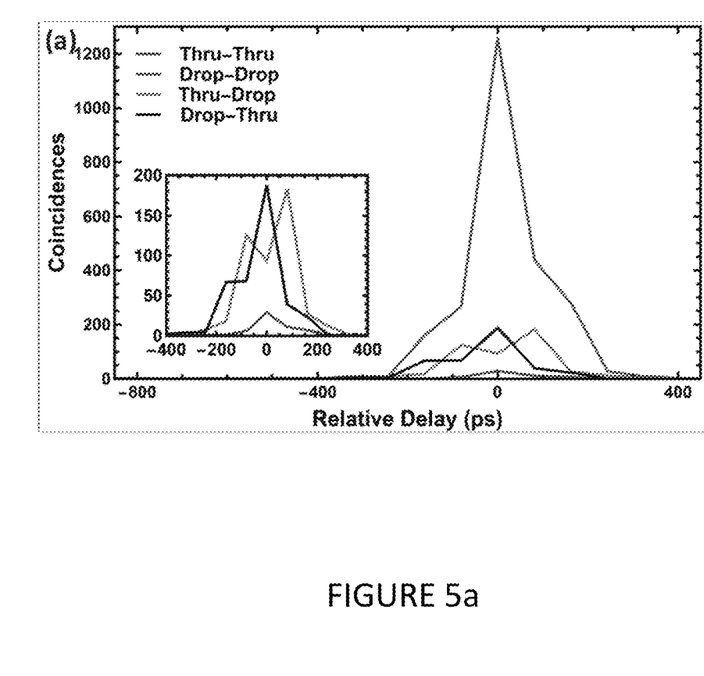
FIG. 5a is a Dual Mach-Zehnder measured photon pairs in the untuned configuration.
Figure 5B:
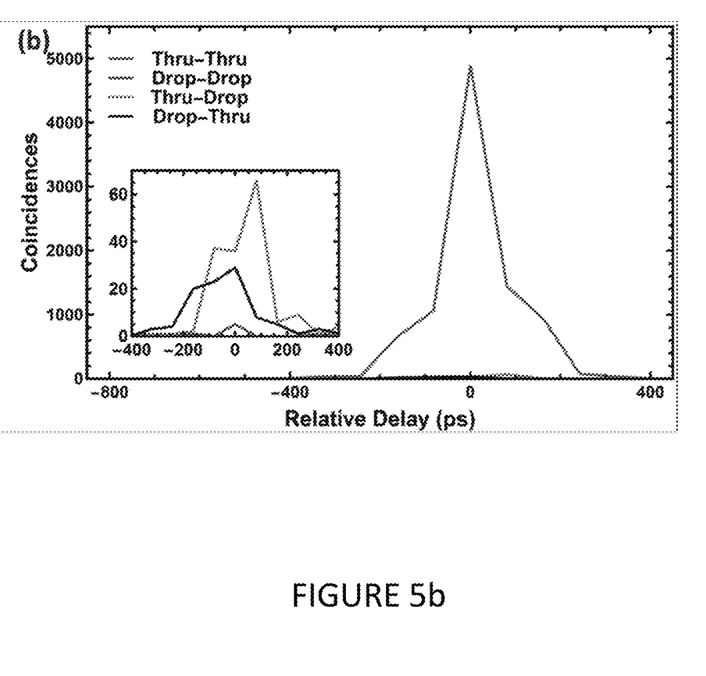
FIG. 5b is a Dual Mach-Zehnder measured photon pairs in the tuned configuration.

The theory of operation of the present invention has been experimentally proven as shown in FIG. 4. The invention exhibits all the cavity resonances when the thermal tuning has not been optimized. When the thermal tuning has been adjusted the undesirable resonances are suppressed as shown in FIG. 4. This demonstrates the spectral filtering of the device, along with the field enhancement from the ring cavity, and the directionality of the desired output for the generated photons shown in FIG. 5a and FIG. 5b. All aforesaid traits being useful for quantum information science applications.

With the confirmation of the dual Mach-Zehnder configuration as an optimal design for the generation of photon pairs, larger photon pair states, and higher squeezed states, the functional building block can be utilized to create entangled states when combined with other integrated waveguide circuits.

Detailed below are five different implementations of the present invention for quantum information science applications. These are not the only implementations that this device can be configured in for these applications. The invention as stated can be used to generate, photon pairs, entangled states, larger entangled states, and higher squeezed states (for continuous variable applications). All embodiments of the present invention described below can be utilized to generate any of these mentioned photon states. Lastly another benefit of the invention is that the source acts as filter for the pump light. This is an easy problem to deal with in bulk optics, but in integrated circuits, removing the pump is difficult since high rejection filters are required on chip to deal with ~10 orders of magnitude difference in pump to signal power. The present invention takes care of a large portion of this filtering.

Figure 6A:
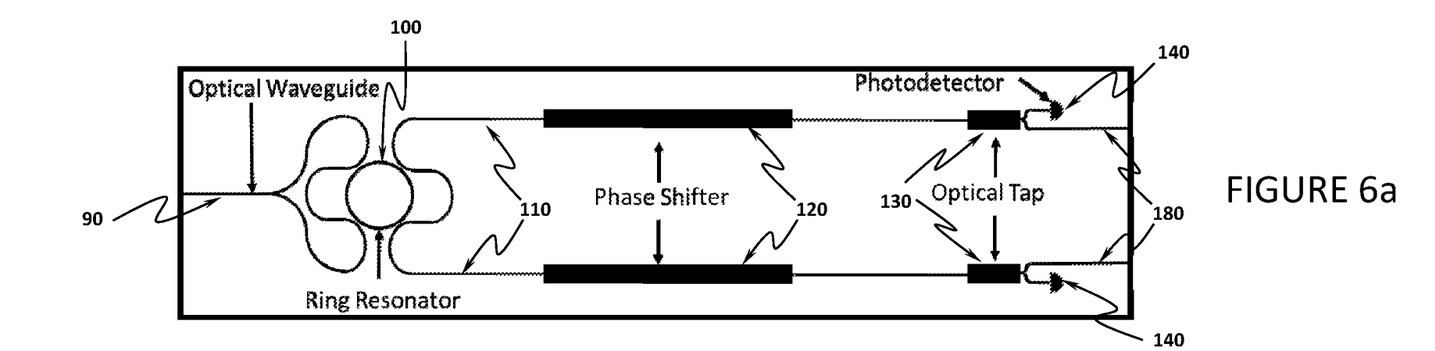
FIG. 6a is an embodiment of the present invention employing a Dual Mach-Zehnder used to produce energy-time entangled photons pairs/squeezed beams.
Figure 6B:
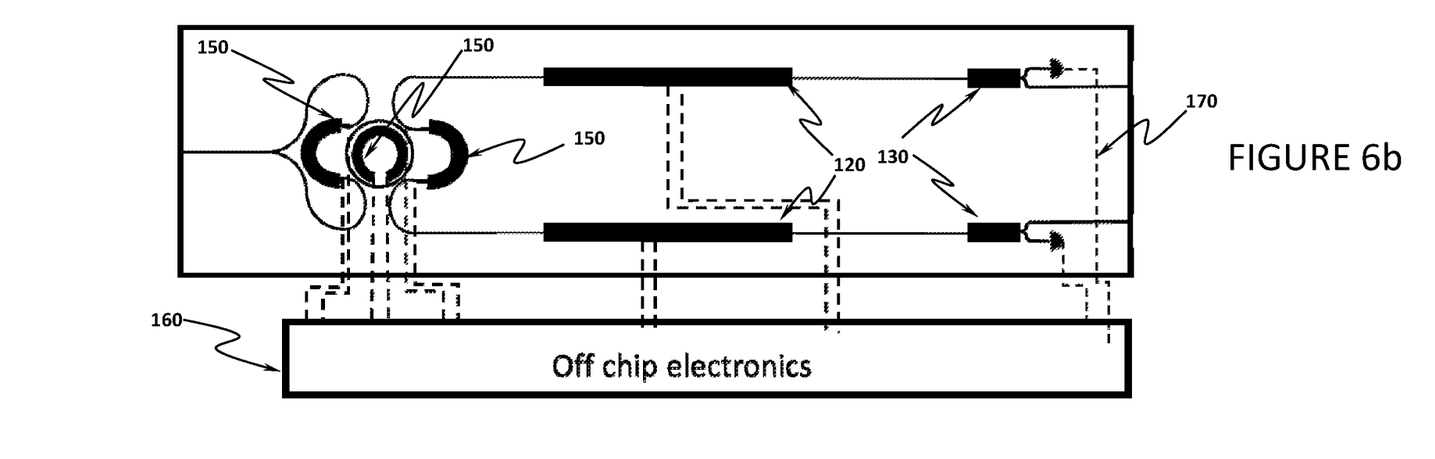
FIG. 6b is an embodiment of the present invention employing a Dual Mach-Zehnder used to produce energy-time entangled photons pairs/squeezed beams, further depicting interconnections to the off chip electronics.

Referring now to FIG. 6a and FIG. 6b concurrently depicts a dual Mach-Zehnder (DMZ) source being single or bi-directionally pumped from a continuous wave or pulsed laser source (not shown) via an optical waveguide 90. The lower diagram in FIG. 6b, FIG. 7b, FIG. 8b and FIG. 9b depicts an overlay of the off chip electronics 160 and its associated control lines 170 (dashed lines) to detection 140 and phase shifting 150 elements.

The pump photons interact in the micro-ring resonator cavity 100 and produce signal/idler photons, which exit via the optical waveguides 110 to the right of the micro-ring resonator 100. The signal/idler photons pass through phase shifters 120 which can compensate for length and timing differences before hitting an optical tap 130 where a small portion may be sent to a photodetector 140 to monitor the photons. The other ports 180 allows the photon pairs/squeezed beams to pass to the rest of the circuit on the integrated chip or leave off chip. The device is controlled by off chip electronics 160, with electrical control lines 170 being depicted as dashed lines in each of FIG. 6 through FIG. 9. Part of what the off chip electronics 160 controls are the "heater" mechanisms 150. Heater mechanisms 150 designated in FIG. 6 through FIG. 10 as wide, solid black sections comprise material that is placed alongside optical waveguide within the DMZ. When activated by the off chip electronics, the heater mechanisms 150 heat the adjacent optical waveguide, causing a dimensional change in the optical waveguide. The optical dimensional change insofar as the optical waveguide length is affected will cause a phase shift for any light therein. The net desired effect is to alter the relative optical lengths between the upper and lower waveguides and the optical length of the ring resonator 100 within the DMZ.

Figure 7A:
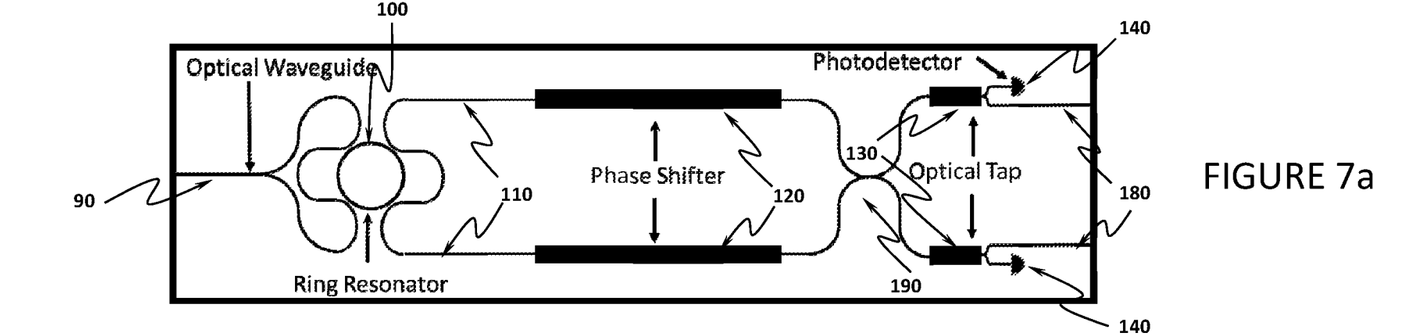
FIG. 7a is an embodiment of the present invention employing a Dual Mach-Zehnder used to produce N00N states or pairs/squeezed beams.
Figure 7B:
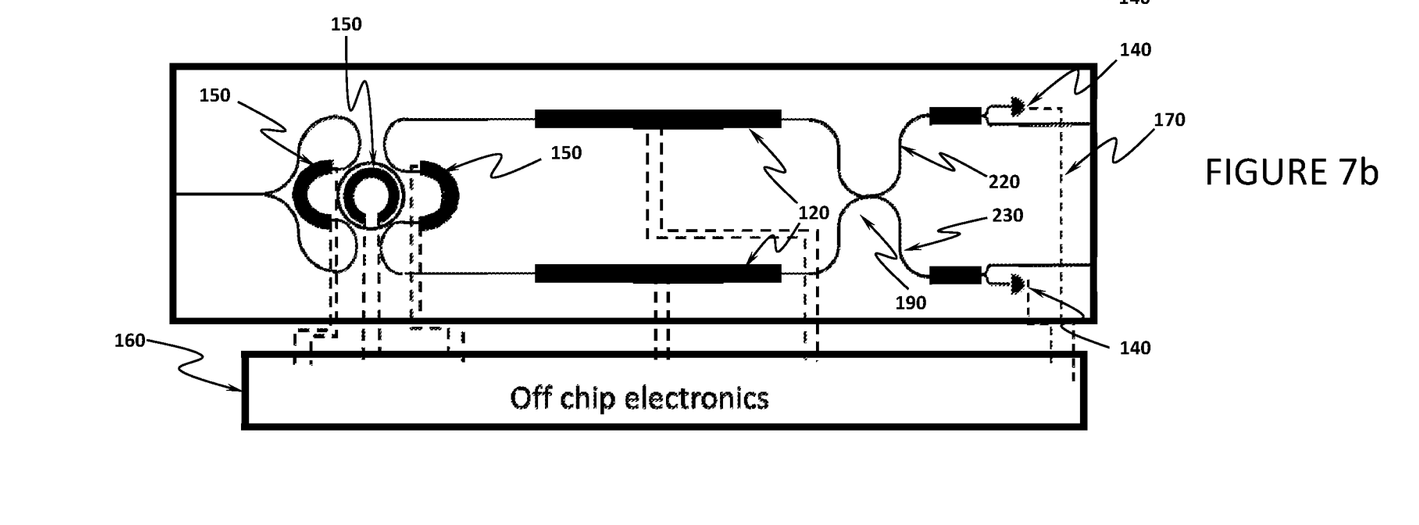
FIG. 7b is an embodiment of the present invention employing a Dual Mach-Zehnder used to produce N00N states or pairs/squeezed beams, further depicting interconnections to the off chip electronics.

Referring now to FIG. 7a and FIG. 7b concurrently depicts DMZ source being pumped bi-directionally from a laser (continuous wave or pulsed) via an optical waveguide 90. The pump photons interact in the ring resonator 100 and produce signal/idler photons in both clockwise and counter-clockwise directions, thus producing path indistinguishable photons created in the ring 100. These photons then exit via the optical waveguides 110 to the right of the ring. The signal/idler photons pass through phase shifters 120 which can compensate for length and timing differences before simultaneously impinging on a directional coupler 190. Directional coupler 190 is formed from one linear optical channel 220 connected between one of the phase shifters 120 and the corresponding optical tap 130, and another linear optical channel 230 connected between one of the phase shifters 120 and the corresponding optical tap 130. The two linear channels 220, 230 are substantially tangential at one point along their approximate mid-length. It is at this substantially tangential point that light is free to couple from one of the two linear optical channels to the other, thereby producing a coupling effect. The resultant coupler 190 mixes the photon states producing an entangled state called a N00N state, or N photon, Zero, Zero, N photon state. The state exits the coupler 190 and passes to an optical tap 130 where a small portion may be sent to a detector 140 to monitor the photons. The other ports 180 allows the photons to pass to the rest of the circuit on the integrated chip or leave off chip.

Figure 8A:
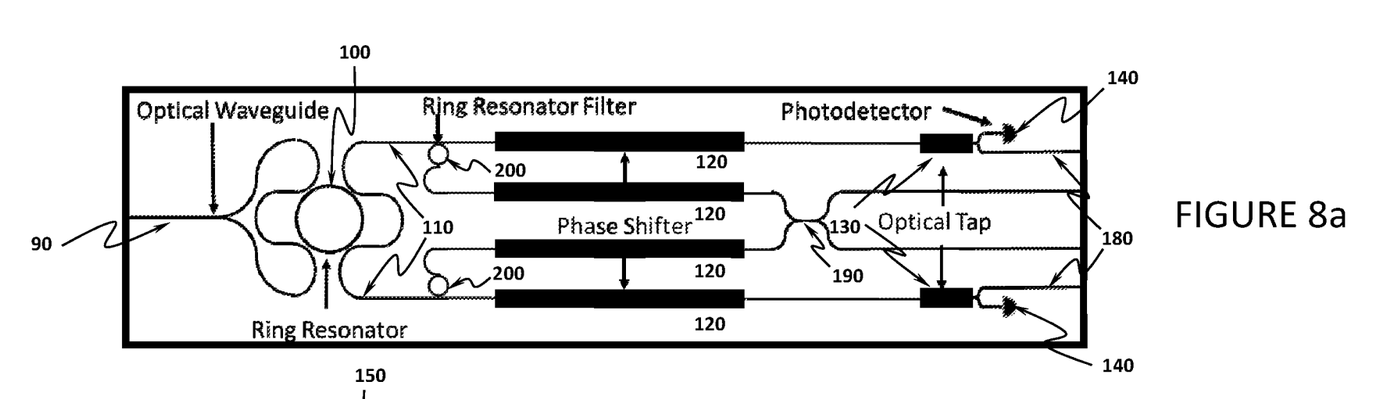
FIG. 8a is an embodiment of the present invention employing a Dual Mach-Zehnder used to produce N00N states and pairs/squeezed beams simultaneously.
Figure 8B:
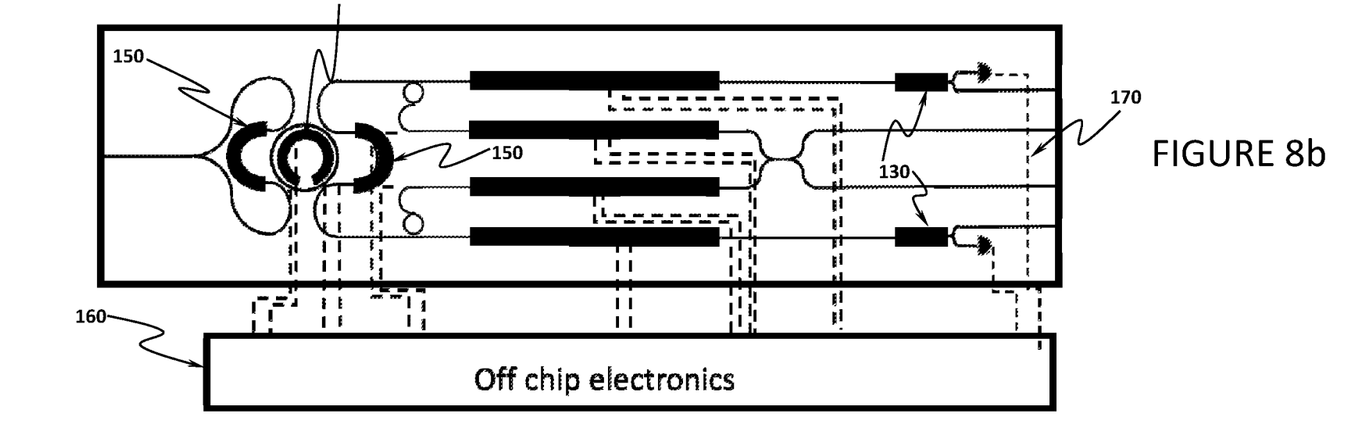
FIG. 8b is an embodiment of the present invention employing a Dual Mach-Zehnder used to produce N00N states and pairs/squeezed beams simultaneously, further depicting interconnections to the off chip electronics.

Referring now to FIG. 8a and FIG. 8b concurrently depicts DMZ source being pumped bi-directionally from a laser (continuous wave or pulsed) via an optical waveguide 90. The pump photons interact in the ring resonator cavity 100 and produce signal/idler photons in both clockwise and counter-clockwise directions, thus producing path indistinguishable photons created in the ring resonator 100. These photons then exit via the optical waveguides 110 to the right of the ring resonator 100. The spectrally degenerate photons are selected by an optical ring resonator filter 200 and pass through phase shifters 120 which can compensate for length and timing differences before impinging on a directional coupler 190. This coupler 190 mixes the photon states producing an entangled state called a N00N state, or N photon, Zero, Zero, N photon state. The state exists the coupler 190 and passes to the rest of the circuit on the integrated chip or leave off chip. The photons that are not selected by the filter 200 travel on a different waveguide, passing through a phase shifter 120 and then hitting an optical tap 130. This resonant comb of other wavelengths can be monitored with a photodetector 140 or passed to other circuitry to be utilized elsewhere. This source, shown in FIG. 8a and FIG. 8b, can then produce N00N states, entangled frequency combs, and or squeezed states simultaneously.

Figure 9A:
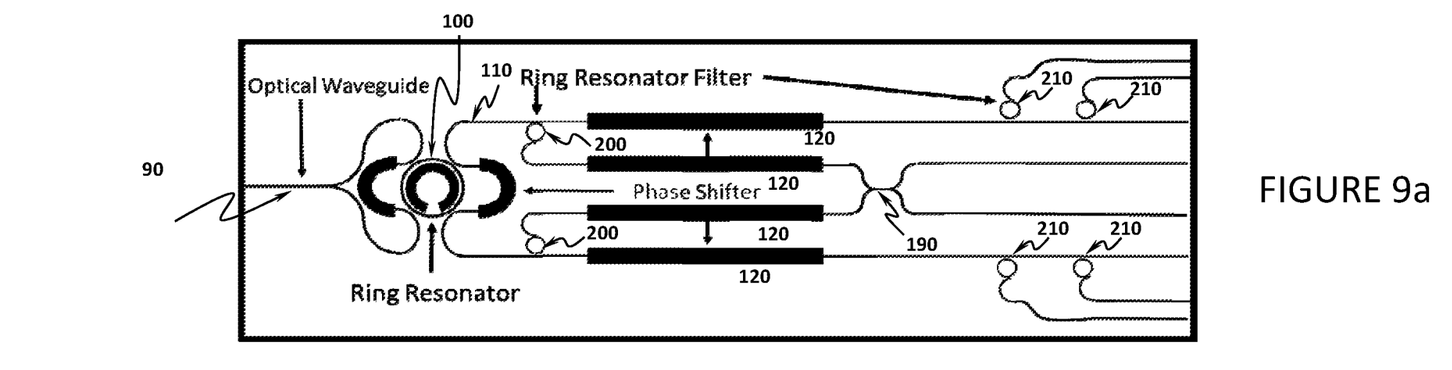
FIG. 9a is an embodiment of the present invention employing a Dual Mach-Zehnder used to produce N00N states, frequency combs, and pairs/squeezed beams simultaneously.
Figure 9B:
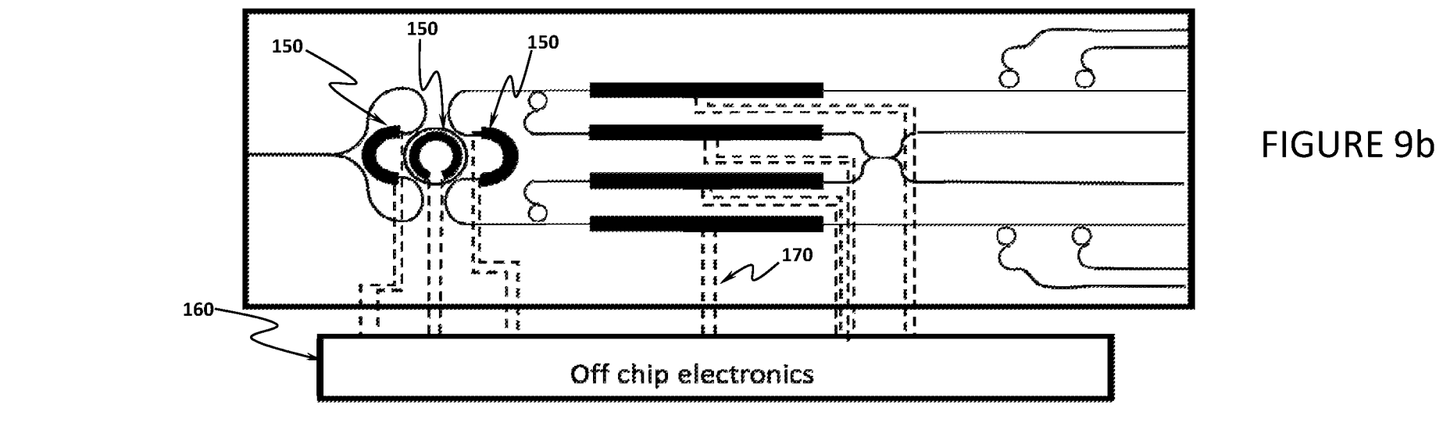
FIG. 9b is an embodiment of the present invention employing a Dual Mach-Zehnder used to produce N00N states, frequency combs, and pairs/squeezed beams simultaneously, further depicting interconnections to the off chip electronics.

Referring to FIG. 9a and FIG. 9b concurrently depicts The DMZ source is pumped bi-directionally from a laser (continuous wave or pulsed) via an optical waveguide 90. The pump photons interact in the ring resonator cavity 100 and produce signal/idler photons in both clockwise and counter-clockwise directions, thus producing path indistinguishable photons created in the ring resonator 100. These photons then exit via the optical waveguides 110 to the right of the ring resonator 100. The spectrally degenerate photons are selected by an optical ring resonator filter 200 and pass through phase shifters 120 which can compensate for length and timing differences before impinging on a directional coupler 190. This coupler 190 mixes the photon states producing an entangled state called a N00N state, or N photon, Zero, Zero, N photon state. The state exits the coupler 190 and passes to the rest of the circuit on the integrated chip or leave off chip to other circuits. The photons that are not selected by the ring resonator filter 200 travel on a different waveguide, passing through a phase shifter 120 followed by two additional filters 210. These two secondary filters 210 can serve a number of functions. They can further filter the pump wavelength to allow for a filtered set of photons to leave on the original waveguide. They can each filter out a different set of wavelengths to produce more correlated outputs, one on each set of filter outputs and letting the rest of the comb exit on the original waveguide when multiple correlated outputs are required. This source can then produce N00N states, multiple energy-time correlated pairs/squeezed beams, entangled combs, and squeezed states simultaneously.

Figure 10:
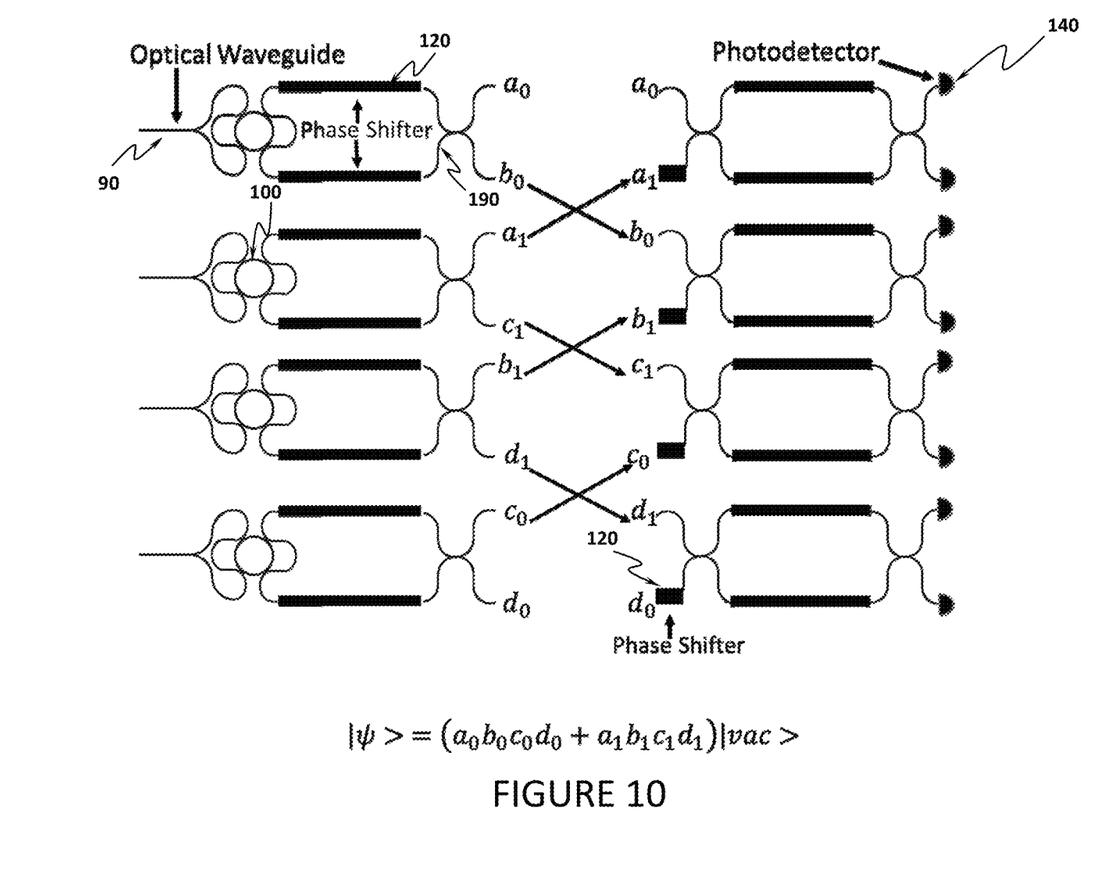
FIG. 10 is an embodiment of the present invention employing a Dual Mach-Zehnder used to produce N00N states, frequency combs, and pairs/squeezed beams simultaneously.

Referring to FIG. 10 depicts the DMZ source being pumped bi-directionally from a laser (continuous wave or pulsed) via an optical waveguide 90. The pump photons interact in the ring resonator cavity 100 and produce signal/idler photons in both clockwise and counter-clockwise directions, thus producing path indistinguishable photons created in the ring resonator 100. These photons then exit via the optical waveguides to the right of the ring resonator 100. The signal/idler photons pass through phase shifters 120 which can compensate for length and timing differences before simultaneously impinging on a directional coupler 190. This coupler 190 mixes the photon states producing an entangled state called a N00N state, or N photon, Zero, Zero, N photon state. The state exits the coupler 190 and passes to a switching network which in one implementation could consist of Mach-Zehnder interferometers (MZI). These MZI's mix the photon states in a reconfigurable manner that allows the creation of entangled states. These can range from two photon (Bell states) to larger entangled states (Cluster and Greene-Horne-Zeilinger (GHZ) states). The circuit can be used to produce states important for small scale quantum information processing, specifically quantum computation. The optical waveguides can terminate with photodetectors 140 allowing the entire computation to be completed on chip.

Still referring to FIG. 10, the invention produces larger entangled photon states. The invention would be the quantum equivalent of an FPGA (field programmable gate array) in classical computing, thus one advantage is the reconfigurability. The invention functions in the following way, a pump laser is input to optical waveguide 90, and travels to ring 100. Inside ring 100, the pump laser's photons are converted into pairs of photons which are correlated, or twin photons. Due to the design of the optical waveguide 90, connecting to the ring 100, only the twin photons enter the two phase shifters 120, while the pump laser light remains in ring 100. These twin photons traveling through 120 experience a phase shift and interfere at directional coupler 190. These correlated photons are entangled and can be used as quantum bits for computation. All this occurs in only one section of the invention from 90, to 100, to 120, to 190. Ideally for real computations more than two quantum bits are required, so the necessary components 90, 100, 120, and 190 are repeated in an array from 1 to n. To allow all of these different sources to become entangled, through interference, and function together a large array of these interferometers are required, made of components 190, 120, and 190. The required grid of interferometers is n×n, where n is number of waveguides exiting all the rings 100. Encoding via interference and phase shifts via 120, are imprinted on the channels to create larger quantum states or enact a calculation. The result of these changes can be measured via a photodetector 140, and the results are recorded via electronics. This invention would be one incarnation of a photonic processor for quantum computation. This device allows for the generation of large entangled states in a reconfigurable fashion due to the mesh network of interferometers.

The dual mach zehnder photon source, 90 & 100, allows for on chip filtering of the pump laser, something not done before in a source. This source also allows for the use of a single integrated chip as most systems would need to filter the pump light off chip before going to the interferometric mesh network.

The dual mach zehnder design allows for controlled directionality of the twin photons, which are the required quantity needed for computation (these are the quantum bits). Traditional sources lose 50% of these twins just from their source design. Therefore the dual mach zehnder source allows for a reduction in the required pump laser power compared to other sources. This makes the overall device more efficient.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A photon generator device, comprising:
   a ring resonator disposed in a chip, said chip having an input and a plurality of outputs;
   a first optical channel disposed in said chip, said first optical channel having a first input and a first output, said first input and said first output being in common with each other and with said input to said chip;
   said first optical channel being tangential to said ring resonator at a first point and a second point;
   a second optical channel disposed in said chip, said second optical channel having a second input and a second output,
   said second optical channel being tangential to said ring resonator at a third point and a fourth point;
   a first filter having an output for selecting spectrally degenerate photons from said second input of said second optical channel;
   a second filter having an output for selecting spectrally degenerate photons from said second output of said second optical channel;
   a first predeterminable relative phase delay between said first optical channel and said second optical channels, so as to cause a variance in an amount of light traversing said first optical channel and said second optical channels as a function of the frequency of said light;

a second predeterminable relative phase delay between said second input of said second optical channel and said second output of said second optical channel;

at least one filter of a third filter group having an output in common with a first output of said plurality of outputs of said chip, where said at least one filter of said third filter group selects predetermined wavelengths of light from said phase delayed second input of said second optical channel;

at least one filter of a fourth filter group each having an output in common with a second output of said plurality of outputs of said chip, where said at least one filter of said fourth filter group selects predetermined wavelengths of light from said phase delayed second output of said second optical channel;

a third predeterminable relative phase delay between said first filter output and said second filter outputs;

an optical coupling between said relative phase delayed first filter output and said relative phase delayed second filter outputs, said optical coupling having a first output and a second output;

a third output of said plurality of outputs of said chip in common with said phase delayed second input of said second optical channel;

a fourth output of said plurality of outputs of said chip in common with said phase delayed second output of said second optical channel;

a fifth output of said plurality of outputs of said chip in common with said first output of said optical coupling;

a sixth output of said plurality of outputs of said chip in common with said second output of said optical coupling; and an electronic control subsystem in operative communication with said chip for facilitating said predeterminable relative phase delays.

2. The photon generator device of claim 1, wherein tangentiality permits a coupling of light between said ring resonator and said optical channels at said first, said second, said third and said fourth points.

3. The photon generator device of claim 1, wherein said first predeterminable relative phase delay is induced by a relative difference in length between said first optical channel and said second optical channel.

4. The photon generator device of claim 3 wherein said relative difference in length is induced by thermal expansion.

5. The photon generator device of claim 4, wherein said thermal expansion is induced by a heated medium in proximity of said optical channels.

6. The photon generator device of claim 1, wherein said second predeterminable relative phase delay is induced by a relative difference in the length of optical channel from said second input of said second optical channel to one of said plurality of outputs of said chip, and the length of optical channel from said second output of said second optical channel to one of said plurality of outputs of said chip.

7. The photon generator device of claim 6 wherein said relative difference in length is induced by thermal expansion.

8. The photon generator device of claim 7, wherein said thermal expansion is induced by a heated medium in proximity of said optical channels.

9. The photon generator device of claim 1, wherein said third predeterminable relative phase delay is induced by a relative difference in the length of optical channel from said first filter output to said optical coupling, and the length of optical channel from said second filter output to said optical coupling.

10. The photon generator device of claim 9 wherein said relative difference in length is induced by thermal expansion.

11. The photon generator device of claim 10, wherein said thermal expansion is induced by a heated medium in proximity of said optical channels.

12. The photon generator device of claim 1, where said first and said second filters are ring resonator filters.

* * * * *